United States Patent [19]
Eickmann

[11] 3,801,046
[45] Apr. 2, 1974

[54] FLUID BORNE CRAFT DRIVEN BY HYDROSTATICALLY OPERATED PROPELLERS GOVERNED BY AN ACCIDENT PEVENTING AUTOMATIC CONTROL DEVICE

[76] Inventor: Karl Eickmann, 2420 Tshiki, Hayama-machi, Kanagawa-ken, Japan

[22] Filed: Apr. 11, 1972

[21] Appl. No.: 243,519

Related U.S. Application Data

[60] Continuation of Ser. No. 48,849, June 11, 1970, abandoned, which is a continuation of Ser. No. 766,741, Oct. 11, 1968, abandoned, which is a division of Ser. No. 552,559, May 24, 1966, Pat. No. 3,405,890.

[52] U.S. Cl. .................. 244/17.23, 343/112 CA
[51] Int. Cl. ............................................. B64c 27/08
[58] Field of Search .................. 343/112 CA, 7 ED; 244/17.11, 17.19, 17.23, 17.21, 17.13, 60, 53 R

[56] References Cited
UNITED STATES PATENTS

| | | | |
|---|---|---|---|
| 1,827,438 | 10/1931 | Rauch | 244/60 |
| 3,049,321 | 8/1962 | Nichols | 244/17.19 |
| 3,095,560 | 6/1963 | Castellini | 343/112 CA UX |
| 3,153,232 | 10/1964 | Fletcher et al. | 343/112 CA UX |

FOREIGN PATENTS OR APPLICATIONS

| 58,961 | 5/1913 | Austria | 244/17.11 |
|---|---|---|---|

Primary Examiner—George E. A. Halvosa
Assistant Examiner—Paul E. Sauberer
Attorney, Agent, or Firm—McGlew and Tuttle

[57] ABSTRACT

A fluid borne craft, such as a helicopter, has propellers driven by positive displacement hydraulic fluid operated motors, supplied with hydraulic fluid under pressure from a pump or the like driven by a suitable prime mover. One of the propellers is located behind the other in the travel direction of the craft. The motors are connected in series in the hydraulic flow circuit, and constitute an upstream motor and a downstream motor, so that the propellers operate at substantially equal angular velocities. By-pass means are associated with at least one of the fluid motors, so that a very restricted amount of the working fluid, supplied to the motor, can by-pass from a supply line into a return line to adjust the speed of the associated motor to a limited extent. Radar means on the craft continuously scan the projected flight path or direction of the craft so as to detect any obstacles or any approaching craft. The radar means is connected to electronic and electromagnetic control means and force intensifiers in such a manner that, responsive to a radar pulse reflected from an object in the path of the vehicle, an adjustment is made in the speed, travel direction, or attitude of the craft so as to avoid a collision. The arrangement may also operate to reverse the direction of movement of the craft in order to avoid an imminent collision. The restriction of the cross-sectional area of the by-pass lines prevents tilting of the craft and accidents while assuring a suitable response to avoid obstacles while maintaining the aircraft stable rest in the air during the obstacles avoiding action.

3 Claims, 3 Drawing Figures

INVENTOR.
KARL EICKMANN

FLUID BORNE CRAFT DRIVEN BY HYDROSTATICALLY OPERATED PROPELLERS GOVERNED BY AN ACCIDENT PEVENTING AUTOMATIC CONTROL DEVICE

CROSSREFERENCE TO RELATED APPLICATION

This application is a continuation application of my co-pending U.S. Pat. application Ser. No. 48,849 of June 11, 1970, now abandoned which is a streamlined continuation of my then copending older U.S. Pat. application Ser. No. 766,741 of Oct. 11, 1968, now abandoned and which was a copending division of my older U.S. Pat. application, Ser. No. 552,559 filed May 24, 1966 for CONTROL MEANS IN FLUID POWER DRIVEN FLUID-BORNE VEHICLES, now U. S. Pat. No. 3,405,890 issued Oct. 15, 1968.

SUMMARY OF THE INVENTION

This invention relates to propeller driven or supported fluid borne craft, and more particularly to a novel and improved fluid borne craft, having a plurality of propellers, which are driven by hydraulically operated positive displacement fluid motors. A fluid flow adjustment means is operatively associated with at least one of the positive displacement hydraulic motors, or its associated supply and return lines, for the purpose of varying the rate of flow of hydraulic fluid through the associated motor through a limited extent.

In accordance with the invention, an automatic control device is provided with means for sensing remote obstacles, hazards, or other craft and to utilize sensing impulses to govern the actions of the fluid flow adjustment means with which it is associated.

If an obstacle, hazard or other craft is sensed, the rate of flow through the respective propeller-driving fluid motor is corrected in such a way that the fluid borne craft either reduces its speed of movement toward the sensed object, or comes to rest in the fluid, or starts to move away from the sensed obstacle, hazard or other craft.

The fluid drive of the propellers may consist of a fluid flow cycle from a fluid flow producing means to and through a delivery fluid line to an upstream positive displacement fluid motor driving a propeller, through a medial fluid line from the upstream fluid motor to and through a downstream fluid driving a propeller and therefrom through a return fluid line back to the fluid flow producing means.

The fluid flow adjustment means may be a variable orifice connected into a by-pass line leading from a fluid line before the respective fluid line to a fluid line after the respective fluid motor. Thereby under the difference of pressure between the fluid lines before and after the fluid motors a limited amount of fluid by-passes the fluid motor through the bypass. The extent of opening of the variable orifice in the by-pass fluid line adjusts the rate of flow through the by-pass.

Depending on the rate of flow of fluid through the by-pass fluid line the rotary angular velocity of the propeller driven by the fluid motor decreases within certain limits. The limits are set by the cross sectional area through the by-pass and orifice.

Thus the rotary velocity of the fluid motor and of the propeller driven thereby decreases, if the orifice opens. In a helicopter with upstream and downstream motors with about vertical propeller axes, the helicopter tilts forward, if the orifice of the upstream motor is opened, and it tilts backward, if the orifice of the downstream motor is opened. Tilting forward results in a forward movement of the craft and tilting back results in backward movement of the craft.

In the preferred embodiment of the invention, a radar station-sender and receiver is installed in the craft. It sends impulses preferably in the forward direction. If the impulses meet an object, the reflected impulses are received in the receiver of the radar set and control, through transformer and power amplifying means, the actuator means of the fluid flow adjustment means.

Thus, the fluid flow adjustment means is governed and operated by the radar sensing means of the craft. If the craft moves toward an obstacle or if obstacles approach the craft, the sensing device and the associated transforming means together with the fluid flow adjustment means govern the craft to change its inclination so, as to slow down its speed, to slow down to rest, or to move back, or to increase forward speed again as soon as the obstacle is out of the way of the flight path of the craft.

It is therefore an object of the invention to prevent accidents by automatic control of the movement of a hydraulically operated fluid borne craft.

Another object of the invention is to automatically control the movement of the craft in case of nearing an obstacle or approach by another craft.

A further object of the invention is to provide sensing means, including pulse transmitting and receiving means, associated with transforming and power amplifying means, to control a fluid flow adjustment means in a fluid borne craft operated by propellers driven by positive displacement hydraulic motors.

A still further object of the invention is to govern an orifice in a bypass line of a hydraulic motor operated fluid borne vehicle by automatic sensing and govering means.

Another object of the invention is to provide a plurality of sensing and governing means for either a single fluid flow adjustment means or to a plurality thereof for the stepwise and continous control of the rotary angular velocity of one or more of the propellers of the fluid borne craft.

For an understanding of the principle of the invention, reference is made to the following description of a typical embodiment thereof as illustrated in the accompanying drawing.

DESCRIPTION OF THE PREFERRED EMBODIMENT

Figure 1:
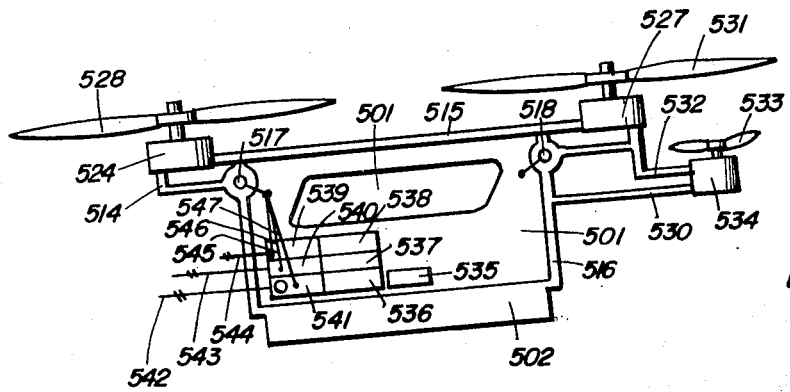
FIG. 1 is an elevation view, partly in section and partly schematic, illustrating a fluid borne, propeller-driven craft embodying the invention.

Referring to FIG. 1, a fluid borne vehicle is illustrated as having a body 501 carrying at least one power plant or fluid flow producing device 502. Body 501 further carries positive displacement hydraulic fluid operated motors 524 and 527 driving respective propellers 528 and 531 rotatable about substantially vertical axes, which are the output shafts of the associated hydraulic motors. A delivery or supply passage 514 connects fluid flow producing means 502 to the input of motor 524 a medial passage or line 515 connects the output of motor 524 to the input of motor 527, a passage 532 connects the output of motor 527 to the input of a motor 534 driving the propeller 533, which is the usual control propeller provided on helicopters, and a passage 530 connects the output of motor 534 to a return flow line 516 connected to fluid flow producing means 502. Propellers 528 and 531 are thus driven at substantially equal angular velocities. Respective valve control means 517 and 518 are provided for varying the rotary velocity of the propellers 528 and 531 relative to each other for changing the attitude of the fluid borne vehicle, i.e., for directing its forward, backward or other movements. The feature of this embodiment of the invention is that this vehicle is provided with an automatically operated hydraulic radar control means for stopping the vehicle automatically, if it nears an object or if an object closes in on the vehicle. For this purpose radar antennas 544, 543 and 542 are provided. 542 is a long distance antenna, 543 a medium distance antenna and 544 a short distance antenna. The antennas are actuated by respective radar means 539, 540 and 541.

Respective power amplifying and control means 538, 537 and 536 are connected to radar means 539, 540 and 541.

Figure 2:
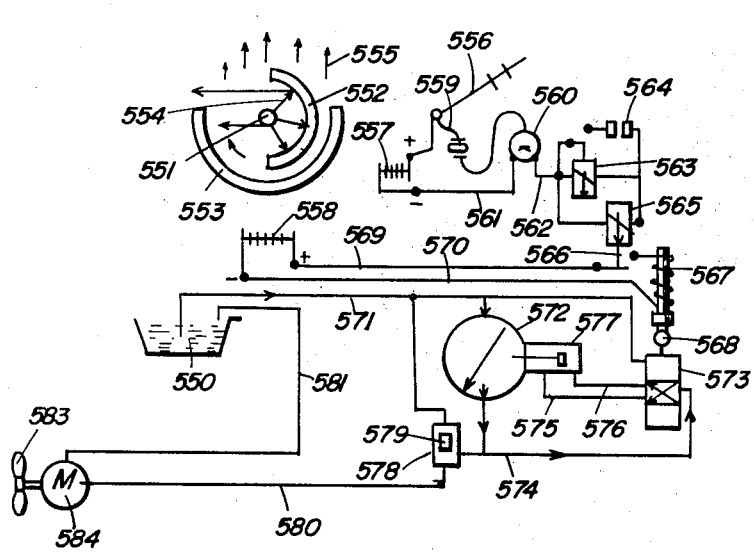
FIG. 2 is an enlarged schematic diagram of one of the components shown in FIG. 1.

FIG. 2 schematically illustrates one example of a power amplifying and control means, such as the power amplifying and control means 536 connected to the radar means 541. Referring to FIG. 2, a radar transmitter 551 supplies radar pulses to a rotatable radar pulse transmitting antenna 552 which rotates about the axis of transmitter 551 which is centered within a semicircular fixed or stationary antenna 553. Radar antenna 553 is so oriented that radar pulses 555 are transmitted forwardly of the craft 501, that is, along the intended path of travel of the fluid borne craft or vehicle. If radar pulses 555 impact on an object in the neighborhood of the vehicle 501, they are reflected to antenna 556. Antenna 556 has an electric potential applied thereto from battery power supply means 557. The impulses received at antenna 556 are transmitted through crystal 559 to one electrode of transistor 560 which has another electrode connected to the negative terminal of source 557. Through conductor 562 connected to a third electrode of transistor 560, the received impulse is used to energize a relay 563 and a condenser 564 coupled therewith, relay 563 and condenser 564 controlling energization of a second relay 565. When relay 565 is transferred, its armature 566 closes an energizing circuit for an electromagnetic actuator 567 which has a relatively strong potential supplied thereto from a potential source 558 through conductors 569 and 570. If those reflected pulses returning parallel to the pulses 555 and received by antenna 556 are reflected by an object in the path of the vehicle and are sufficiently strong, electromagnetic actuator 567 is energized. Actuator 567 is connected by a coupling means 568 to, for instance, a hydraulic control means, such as hydraulic valve 573. This may be a four way control valve and may pass fluid through passage means 575 and 576 into a control means 577 for adjusting the delivery quantity of a variable pump 572. Variable pump 572 may either be driven by a power plant or may be hydraulic motor driven from another hydraulic current which is existing in the vehicle. A control valve including cylinder 578 with a piston 579 therein, may also be provided, and passage 574 may lead from the variable pump 572 to valve 573. From a flow current in the helicopter or from tank 550, fluid may be supplied to the variable fluid power supply 572. The quantity of flow current, which is then delivered from pump 572 via control 578, 579 through passage 580 flows to motor 584 for propeller 583, and returned through pipe 581 to tank 550. Instead of sending a fluid flow through passage 580 to a hydraulic motor 581 which may be the actual motor 534, 527 or 524 of the fluid borne vehicle, it is also possible to send the flow of fluid through passage 580 into an actuator for actuating control valve 517 or 518. Respective connections may be provided between radar means 539, 540 and 541, or their associated control and power amplifying means 538, 537 and 536. In any case the principle of the radar hydraulic automatic aircraft is that transmitted radar pulses, if they are reflected by an object in the path of the vehicle, return to the vehicle, are received on antenna 556 and are used, through a transistor amplifier, associated relays, and an electromagnetic actuator to control the hydraulically operated motors of the vehicle. By this control the vehicle may be slowed or it may be stopped in the air. Also the vehicle may be made to move backward or vertically to avoid any collision. Thus collision between airborne vehicles, for example, can be effectively prevented by the system of this invention.

Control means 535 may be an altitude control means and may be responsive to the density of the fluid wherein the vehicle is borne. Thereby the aircraft or vehicle can be restricted to a maximum altitude or to a maximum altitude above ground. If such an automatic altitude control and adjusting means 535 is provided, it will use its measurement impulses for controlling a hydraulic control means for controlling either the rotary velocities and power of the power plants or for controlling the delivery quantity of flows out of the fluid flow producing devices. As soon as the maximum altitude is reached, it will decrease the delivery quantity of the fluid flow producing means and thereby prevent the vehicle from climbing to still higher altitudes. If each vehicle of this kind is provided with such altitude control means, then no such vehicle could exceed a certain altitude, and the airspace above the earth could be limited to a certain altitude for airborne vehicles as shown in this invention. Therefore, the higher altitude airspace could be set aside for faster flying vehicles or for intercontinental or long distance service.

Figure 3:
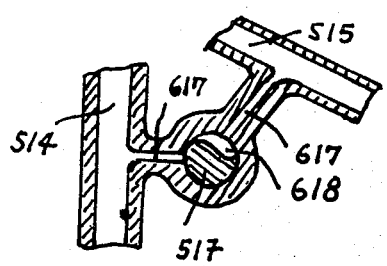
FIG. 3 is an enlargement of a portion of FIG. 1.

In FIG. 3 an enlargement of the by pass control valve of FIG. 1 is illustrated. The controller 517 is by way of example rotary mounted in the housing. The controller contains a recess 618 of a crossectional area, which is restricted to be only a minor fraction of the cross sectional area through main flow lines 514 and 515. The controller 517 may be turned by the means responsive to the radar impulses, so as either to open or to close the communication between fluid lines 617 to the controller recess 618 of controller 517. The fluid lines or by-pass lines 617 connect the controller 517 with the respective main fluid line 514 and 515 or a respective other main fluid line.

An important feature of the invention, is that the cross-sectional area through the recess 618 of controller 517 and best also through the by pass lines 617 is of a cross-sectional area which is only a minor fraction of the cross-sectional area through the main fluid lines 514, 515 etc.. The restriction of the cross-sectional areas through the recess 618 and/or through the by pass fluid lines 617 is an important means of the invention. It prevents, that too much flow can flow through the by-pass line or control means 617 or 517 respectively. Because, if too much fluid could flow therethrough, the associated propeller might so much slow down its rotary velocity, that the lift of the associated propeller would decrease so much, that the vehicle would turn over the propeller and crash. The crashing of such vehicle is prevented by the restriction of the crossectional area through the by-pass lines 617 and/or through the controller 517. Because in case of automatic control of a vehicle, the security means should be more cautious for the remote event, that the automatic control fails or makes mistakes, the restriction of the by pass lines and/or control means of this invention makes the vehicle safe for movement in the air. Because, even if the automatic control would fail, the vehicle can not crash any more, because even an accidental opening of the valve 517 keeps the flow through it so much restricted, that the vehicle can not tilt over the associated propeller, but instead remains stable in the air. In normal application, the control recess 618 is set by the automatic radar control device so, as to be communicated or closed to the by-pass lines 617. The opening or closing of the communication decides the travel path of the vehicle, because it decides also the degree or rate of inclination of the vehicle in the air.

I claim:

1. An airborne craft comprising, in combination, a body; at least a pair of propellers mounted on said body in spaced relation along the longitudinal axis, which is the usual travel direction of said craft, for rotation about substantially vertical axes to support said craft in the air, said propellers controlling the attitude of the craft in the air; respective hydraulic motors each driving one of said propellers; one of said motors operating as an upstream-motor and the other as a downstream-motor; a dynamic source of hydraulic fluid under pressure mounted on said body; a first fluid line connecting the exit port of said source to the inlet port of said upstream-motor; a medial fluid line connecting the exit port of said upstream-motor to the entrance port of said downstream-motor; a return fluid line connecting the exit port of said downstream-motor to said source; said source supplying hydraulic fluid to said first fluid supply line for rotation of said propellers at constantly substantially proportionate velocities while said fluid flows through said fluid lines and said upstream and downstream motors; a bypass line connecting the inlet port of at least one of said motors to the exhaust port thereof; said bypass line having a cross sectional area of only a minor fraction of the cross sectional areas of said fluid lines for providing for flow therethrough of only a very small fraction of the fluid supplied to and through the associated motor and effective to change the speed of the associated motor only by an amount insufficient to affect the stability of said airborne craft; a control valve in the said bypass line controlling the flow of hydraulic fluid therethrough; whereby, upon opening of the control valve, only a very small fraction of the hydraulic fluid supplied to and through the associated motor is bypassed therearound to reduce slightly the velocity of the associated propeller to change the attitude and travel direction of said craft; respective actuators for said control valves; radar means on said body transmitting radar pulses in the travel direction of said craft; receiver transducer means operatively interconnecting said radar means and said actuators; receiver means responsive to receive returning radar echo pulses from an obstacle in the travel direction of the craft; said receiver means and transducer means being associated to said actuator for said control valve to activate said actuator to operate said control valve to control the rate of flow of fluid through said bypass line to adjust the relative velocity of the associated motor and propeller to adjust the inclination and travel velocity of the craft in travel direction of said craft to avoid such obstacles.

2. The craft of claim 1, including at least a pair of propellers rotatably mounted on said body about symmetrically spaced axes such that, when the propellers are rotating at equal angular velocities, said vehicle maintains a stable attitude; said propellers being mounted adjustably on said body to control direction of movement thereof, as well as the attitude thereof; respective hydraulic motors each driving one of said propellers, said source of working fluid being connected by supply and return means to all of said motors to supply working fluid thereto normally at constantly proportionate rates; a radar transmitter and a radar receiver, with said associated means being operatively associated with each of said hydraulic motors to control the attitude and direction of movement of said vehicle in the fluid in accordance with the presence or absence of an obstacle in the path of movement of said vehicle.

3. The craft of claim 1 wherein a plurality of radar means and associated means, each one for locating obstacles at different distances, is provided and associated to said by-pass control valves for governing their operation at different values at different distances of the obstacle.

* * * * *